United States Patent Office 3,264,833
Patented August 9, 1966

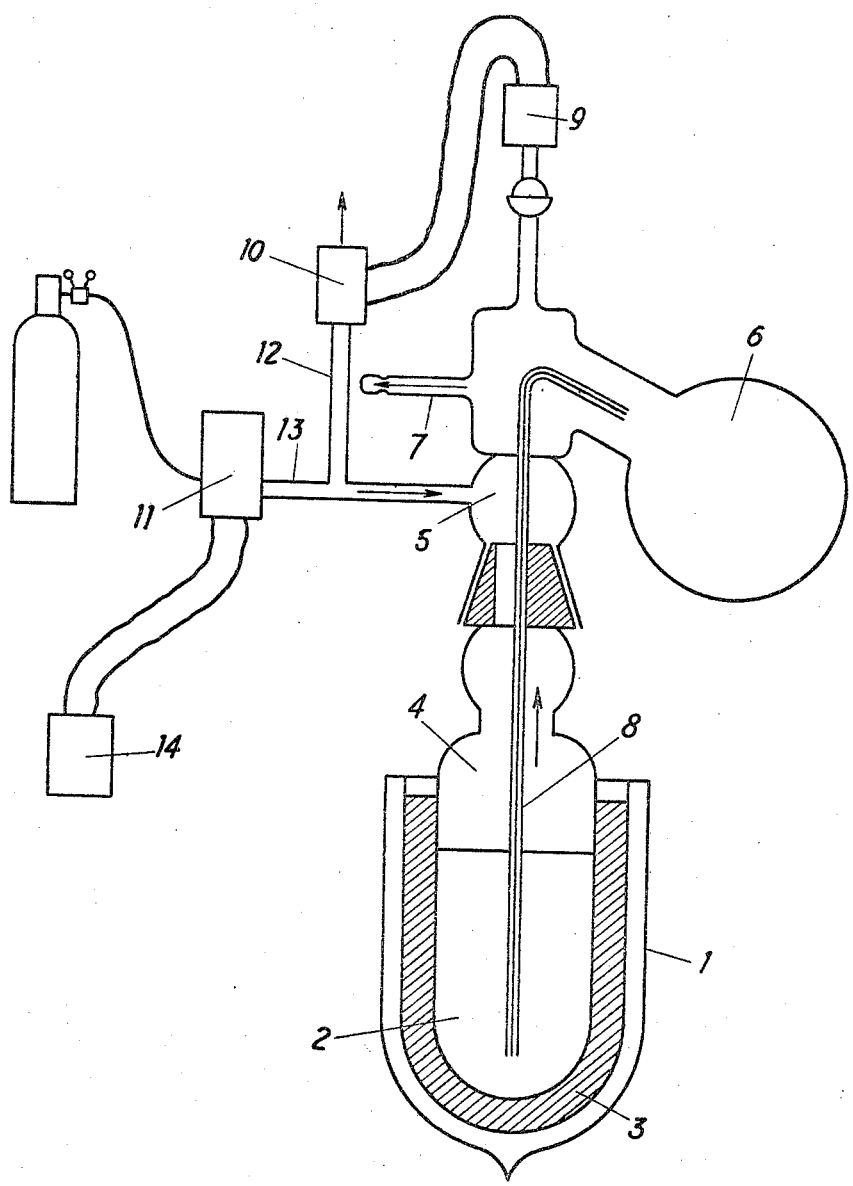

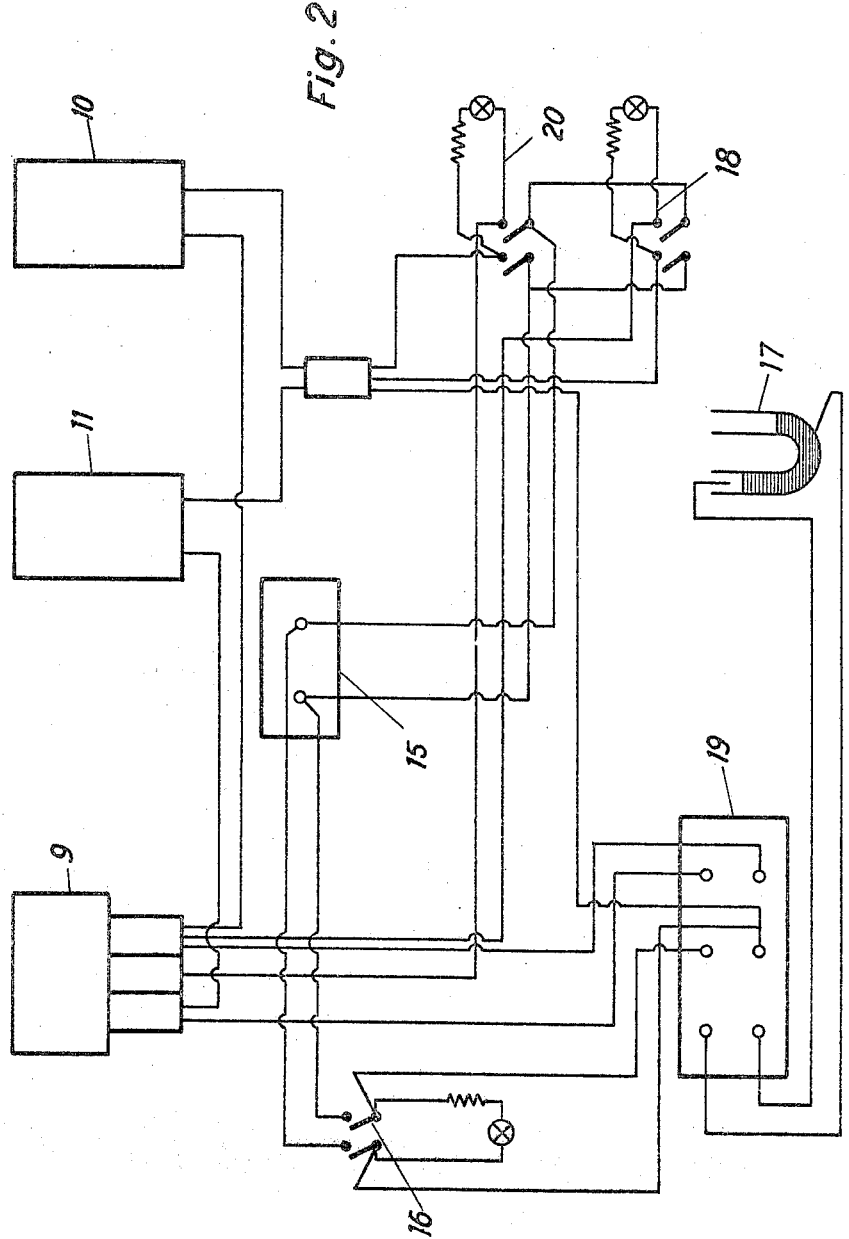

3,264,833
STORING AND DISPENSING OZONE
Francis Mahieux, Genevilliers, France, assignor to L'Air Liquide, Societe Anonyme pour l'Etude et l'Exploitation des Procedes Georges Claude
Filed Sept. 14, 1964, Ser. No. 396,163
Claims priority, application France, Sept. 23, 1963, 948,347, Patent 1,246,273
7 Claims. (Cl. 62—52)

This invention relates to storing and dispensing ozone.

In the specification of U.S. patent application S.N. 58,466 there is described a method of producing a relatively stable solution of ozone which can be obtained, if desired, in a fairly concentrated form, which method comprises dissolving ozone at a low temperature, i.e. below —95° C., in a liquid fluorinated hydrocarbon, preferably a fluorochloromethane. The ozone thus dissolved can be preserved in solution at such a low temperature with but very slow decomposition. Such a method requires the ozone to be kept in a vessel provided with very efficient thermal insulation, owing to the large temperature differential between the solution of ozone and the surrounding medium. When required for use, the ozone is allowed to evaporate at atmospheric pressure by progressive heating of the solution. This method of storage is limited by important disadvantages. During the evaporation, there is a danger that an explosive gaseous phase will be formed, this occurring if the partial pressure of the ozone in the gaseous phase is higher than of equal to the limiting explosive pressure of ozone. It is consequently necessary to observe strict rules as regards the rate of filling of the storage vessel, and the rate of and limiting temperature of evaporation of the ozone in different fluorinated hydrocarbon systems. Moreover, the concentration of the vaporized ozone is not constant and it varies during the evaporation.

In U.S. Patents 3,197,971 and 3,178,898 there are described methods of stabilizing and storing ozone wherein the ozone solution at a low temperature, which is preferably lower than —95° C., is introduced into a pressure-resisting receptacle whose inner surfaces are free from material which could catalyse the decomposition of ozone, the vessel thereafter being closed and its temperature then allowed to rise to ambient temperature. The rise in temperature produces an at least partial vaporization of the ozone from its solvent. However, even with such evaporation under pressure at a given temperature, in a closed vessel, the liberated ozone is not completely stable; the ozone continues to be decomposed even though only very slowly. Thus, the inhibition obtained is only partial and the concentration of the ozone still varies on leaving the storage vessel.

It is an object of the present invention to obviate the problems which may arise in the methods of storing and dispensing ozone referred to above.

Accordingly, in one aspect the present invention provides a process for the storing and dispensing of ozone in a relatively stable and, if desired, concentrated form, which comprises dissolving the ozone at a low temperature in a liquid fluorinated hydrocarbon, and introducing the resulting solution into a receptacle maintained at a low temperature and provided with means for transporting a quantity of said ozone solution from said receptacle to a vaporizer, whereby the ozone may be liberated, at a constant concentration, by total vaporization of successive quantities of the solution of ozone in said vaporizer at a predetermined pressure and rate of delivery.

The invention also provides an apparatus for storing and dispensing ozone comprising a heat-insulated receptacle adapted to contain a solution of ozone in a liquid fluorinated hydrocarbon, means for maintaining said receptacle at a low temperature, a vaporizer, duct means connecting the heat-insulated receptacle and the vaporizer, a gas injector connected to the upper part of the heat-insulated receptacle and enabling the pressure in the latter to be increased whereby when said apparatus is in use a quantity of said ozone solution may be transported from said receptacle through said duct means into said vaporizer, and means enabling the excess pressure in said receptacle to be released when said quantity of ozone solution has entered said vaporizer, said vaporizer being provided with an outlet for the discharge of the vaporized ozone.

Thus, the apparatus for storing and dispensing ozone comprises a heat-insulated receptacle, into which the ozone solution is introduced, maintained at a low temperature and connected to a vaporizer provided with an outlet for the vaporized ozone, and means enabling a small quantity of ozone solution to be transported under controlled conditions from the insulated receptacle to the vaporizer. More specifically, the ozone solution is transported from the heat-insulated receptacle to the vaporizer through duct means, generally in the form of a capillary tube, one end of which dips into the ozone solution in the heat-insulated receptacle and the other end of which extends into the vaporizer. A quantity of the cold ozone solution is forced through said duct means into the vaporizer, by an excess gas pressure exerted in the gaseous phase, in the form of small droplets of the cold ozone solution which drop into the vaporizer, generally left at ambient temperature, in which they evaporate and can then be discharged through the outlet; the apparatus is adapted so that the excess pressure required to transport the ozone solution into the vaporizer is released when a predetermined amount of ozone solution has entered the vaporizer.

The use of the vaporization arrangement in the present invention makes it possible to eliminate the catalytic decomposition of the ozone, and the preservation of concentrated ozone solutions at low temperature can last an unlimited time in liquid nitrogen or oxygen.

One important advantage provided by the present invention is that it enables there to be obtained, ready for use, a gaseous phase of constant concentration which is substantially equal to the concentration of the ozone in solution. For this reason, it is possible to contemplate the use of ozone solutions having an increased concentration of ozone. Furthermore, the safety conditions are improved, because the danger of explosion on evaporation, due to the greater volatility of the ozone, can be completely eliminated, particularly in the case where the pressure and the delivery of the ozone liberated by the vaporization of the ozone solution are controlled automatically, according to one of the modifications of the invention.

In a preferred form of the invention, the apparatus includes an electric circuit controlled by the pressure produced in the vaporizer and connected to an electromagnetic valve regulating the injection of pressure gas into the gaseous phase of the heat-insulated receptacle containing the ozone solution. As soon as a drop of ozone solution is vaporized in the vaporizer, there results a slight increase in pressure. This increase in pressure controls the electric circuit by means of a pneumatic switch or a mercury manometer provided with electric contacts, the circuit being closed when a predetermined increase in pressure is obtained. It is thus possible to regulate an automatically controlled dropwise supply of ozone into the vaporizer.

The gases which are used to produce the excess pressure in the gaseous phase in the receptacle containing the ozone solution are all gases which do not react with ozone under the conditions of the invention, oxygen and nitrogen being particularly suitable.

Preferably, the apparatus is adapted to operate at a pressure in the region of atmospheric pressure, because apparatus made of glass withstands higher pressures only with difficulty. It is possible to employ metal apparatus which is resistant to higher pressures, but it would not then be possible to observe the contents of the apparatus and the catalytic decomposition of the ozone would be greater than occurs with glass.

The vaporization technique used in the invention makes it possible to consider working with solutions of ozone in various fluorochloromethanes. In actual fact, in a preferred embodiment of the invention, the cooling of the receptacle is effected with liquid oxygen or nitrogen and, in this specific case, only trifluoromonochloromethane is suitable as solvent. By providing a more complicated external cooling arrangement, it would be possible to use other fluorinated hydrocarbons, e.g. difluorodichloromethane. Nevertheless, the system comprising trifluoromonochloromethane and ozone has a certain number of important advantages, such as greater stability with respect to explosion and the low reactivity in chemical reactions at high temperatures of the trifluorochloromethane which would not be the case with other fluorinated hydrocarbons, such as difluorodichloromethane.

For a better understanding of the invention, and to show the same may be carried into effect, reference will now be made, by way of example, to the accompanying drawings in which:

FIGURE 1 shows diagrammatically an apparatus for the storage and controlled supply of ozone in accordance with the invention, and FIGURE 2 shows an electrical circuit diagram for the apparatus shown in FIGURE 1.

Referring first to FIGURE 1 of the accompanying drawings, there is shown an apparatus which comprises a heat-insulated receptacle 1 containing a cold liquid phase 2, which consists of a solution of ozone in a fluorinated hydrocarbon and is maintained at a low temperature by a cryogenic fluid 3, and a gaseous phase 4, which consists of the fluorinated hydrocarbon and the ozone in equilibrium with the liquid phase 2, an injector 5 for gas under pressure connected to the upper part of the heat-insulated receptacle 1 by means of, for example, a ground-in plug, and a spherical glass vaporizer 6 which is kept at ambient temperature, has a capacity of approximately 100 ml., and is equipped with a delivery tube 7 through which escapes ozone liberated by vaporization in the vaporizer 6 at constant concentration in the gaseous fluorinated hydrocarbon. The apparatus also includes a capillary tube 8 which provides communication between the cold ozone solution contained in the heat-insulated receptacle 1 and the vaporizer 6.

The shape of the vaporizer is determined by the vaporization which it is desired to obtain of the liquid droplets of cold solution. These latter are injected into the spherical glass vaporizer 6 so as to contact the wall of the vaporizer 6 for a period sufficient to promote the total vaporization of the droplets. Care should be exercised to ensure that the cold solution does not accumulate in the vaporizer 6 with consequent numerous disadvantages.

The vaporizer communicates with a pneumatic diaphragm switch 9 which is itself connected to an electromagnetic valve EV₂ 10 and to an electromagnetic valve EV₁ 11. The injection of gas under pressure into the gaseous phase 4 via the injector 5 is controlled by the electromagnetic valve EV₁ 11, the injector 5 communicating by way of pipes 12 and 13 with the two electromagnetic valves 10 and 11. The electromagnetic valve EV₁ 11 is directly connected to a bottle of compressed gas supplying the pressure gas and to an automatic gas-injection control device 14.

As soon as a drop of solution, already more or less vaporized in the capillary tube 8, is vaporized in the vaporizer 6, the excess pressure which results therefrom is sufficient to operate the pneumatic switch 9; the pneumatic switch 9 may be replaced, for example, by a mercury manometer with electric contacts made, for example, of tungsten and arranged to contact the mercury at a predetermined pressure.

The electric circuit containing the pneumatic switch 9 controls the operation of the electromagnetic valve EV₂ and the electromagnetic valve EV₁ by interchanging the opening of the valves, the valve 11 being closed with respect to the supply of compressed gas when the valve 10 is open and in communication with the surrounding atmosphere, and vice versa. When the valve 11 is closed and the valve 10 open the excess pressure in the gaseous phase 4 which has built up during the time when the valve 11 was open and the valve 10 closed, is eliminated and the injection of cold solution into the capillary tube 8 ceases; the resulting fall in the pressure exerted in the vaporizer 6 causes the pneumatic system to cut out so that the valve 10 is closed and the valve 11 opened, thereby causing a reinjection of high pressure inert gas into the injector 5 and a repeat of the cycle.

Referring now to FIGURE 2 of the accompanying drawing, the electric circuit wiring diagram shown therein comprises an alternating-current supply circuit 15 operating, for example, at 110 volts, which is connected through manual switches formed by the circuit switch 16 with a mercury contact manometer 17, and through the circuit switch 20 with the pneumatic switch 9 and the discharge switch 18; the circuit also comprises the discharge electromagnetic valve 10 and the inlet electromagnetic valve 11, and an inverter thermostatic relay 19 which enables the injection of the high pressure gas to be regulated by means of the pneumatic switch 9 or by means of the mercury manometer 17. The pneumatic switch 9 permits satisfactory operation of the apparatus to take place only at or about atmospheric pressure. This sensitivity to excess pressure slightly restricts its field of application. On the other hand, the mercury manometer 17 permits operation of the apparatus to take place under excess pressure. It is known that the ground glass joints which may be used in such an assembly support only with difficulty a pressure higher than 0.4 bar, i.e. 30 cm. of mercury. The U-tube of the mercury manometer should, therefore, have a height of approximately 35 cm. With this arrangement of the control circuit for the gas injection, the pressure of the liberated ozone is controlled by the height of the mercury and the contacts.

The rate of flow of the liberated ozone is adjustable in two ways for an apparatus of a given type. At constant pressure, it varies with the height of the mercury level and in addition it varies with the pressure of the injected gas. It is possible, using an apparatus in which the volume of the receptacle 1 which can be occupied by the solution of ozone, is 0.5 litre and in which the bore of the capillary tube 8 has a diameter of 2 mm., to cause the mean rate of flow of ozone to vary from 25 l./hr. to 100 l./hr. Under these conditions, with a mean rate of flow of 66 l./hr., 55 to 60 litres of pressure gas, e.g. nitrogen, are consumed in order to vaporize 100 ml. of the solution of ozone dissolved in trifluoromonochloromethane at −180° C., the solubility coefficient S of this solution being equal to 50. The consumption of pressure gas is considerable, but the rate of flow is not regular and it oscillates between two values with each change-over of the electromagnetic valves.

The capacity of the apparatus may be increased at will in order to permit the vaporization of very large volumes.

As the concentration of the liberated gaseous ozone is substantially equal to the concentration thereof in the liquid phase, the arrangement previously described can serve for the analysis of the solution. In actual fact, the relation between S, the solubility coefficient, and $x$, representing the molar fraction of the ozone dissolved in the solvent, can be written as:

$$x \neq \frac{S}{S+400}$$

(This relation has been established from the work carried out by F. Mahieux, M. Servigne and A. Chretien, published in the Bulletin de la Société Chimique de France in 1960, 49–54). If a large quantity of oxygen is also in solution, which is frequently the case, this relation becomes:

$$x \neq = \frac{S}{S + 244.14(1.78a + 3.56b)}$$

in which $a$ and $b$ are fractions of the unit volume of solvent at $-183°$ C. and hence $a+b=1$. Frequently, $b \neq 0.10$, and hence $$x = \frac{S}{S+438}$$

Now $x$ is substantially equal to the volumetric concentration X of the ozone in the evaporated gas (Avogadro's law). This method of measuring is interesting, because the other techniques can be subject to certain losses by evaporation when taking samples. With the arrangement according to the invention, these possible losses are eliminated.

In order to obtain a more precise relation, it is necessary to correct the approximation of Avogadro's law and to take into account the true molecular volumes. If the molecular volume of the trifluoromonochloromethane $V_M^{CF3Cl}$ (at 0° C. and 1 bar) = 21.36 litres, it is found, disregarding the presence of oxygen, that $$x = \frac{S}{S+380}$$

and hence $$\frac{x}{x} = \frac{S+400}{S+380}$$

Taking into account the presence of oxygen, with the notations defined above, there would be found $$\frac{x}{x} = \frac{S+400a+800b}{S+380a+300b}$$

and $$x = \frac{S}{S+380a+800b}$$

An alternative arrangement of the apparatus according to the present invention comprises, as before, a heat-insulated receptacle, adapted to contain cold ozone solution, connected, for example, by way of a ground-in plug, to a gas injector for a gas under pressure, a vaporizer and duct means for transporting the ozone solution from the receptacle to the vaporizer; however, the injections of the pressure gas, into the gaseous phase in the receptacle, are regulated manually by means of a cock, the injection being stopped when a drop of solution falls into the evaporator. Such a manual arrangement requires delicate regulation of the gas injection, but the arrangement has the advantage of simplicity.

What I claim is:

1. A method of storing and dispensing ozone, comprising establishing in a container a body of a solution of ozone in a liquid fluorinated hydrocarbon at low temperature, increasing the pressure of the body of solution by injecting a gas into the container thereby to force a portion of the solution from the container, and totally vaporizing said portion thereby to obtain a vapor having substantially the same composition as said solution.

2. A method as claimed in claim 1, the vapor pressure of the body of solution being about one bar, and discontinuing the introduction of gas into the container when the pressure of said obtained vapor is above a predetermined maximum.

3. A method as claimed in claim 1, and discontinuing the introduction of gas into the container when the pressure of said obtained vapor is above a predetermined maximum.

4. A method as claimed in claim 1, said hydrocarbon being trifluoromonochloromethane, and cooling said container with a liquid selected from the class consisting of oxygen and nitrogen.

5. Apparatus for storing and dispensing ozone in and from a solution of ozone in a liquid fluorinated hydrocarbon, comprising a heat-insulated container, a vaporizer comprising a chamber, conduit means for transferring stored volatile liquid from the container to the chamber upon an increase in pressure in the container, means for injecting a gas into the container to raise the pressure in the chamber to force liquid from the container through the conduit and into the chamber, and means responsive to a rise in the pressure in the chamber above a predetermined maximum to discontinue injection of gas into the container.

6. Apparatus as claimed in claim 5, said responsive means comprising pneumatically operated electric switch means.

7. Apparatus as claimed in claim 5, said responsive means comprising a mercury manometer having electrical contacts that contact the mercury in the manometer when the pressure in the chamber reaches said predetermined maximum.

References Cited by the Examiner

UNITED STATES PATENTS

| | | | |
|---|---|---|---|
| 1,953,533 | 4/1934 | Edwards | 62—51 |
| 2,242,108 | 5/1941 | Bullowa et al. | 62—50 X |
| 2,992,540 | 7/1961 | Grosse et al. | 62—48 |
| 3,001,375 | 9/1961 | Tauscher | 62—52 X |
| 3,053,054 | 9/1962 | Vignier | 62—48 |
| 3,081,157 | 3/1963 | Gordon et al. | |
| 3,091,096 | 5/1963 | Rendos et al. | 62—52 |

LLOYD L. KING, *Primary Examiner.*